United States Patent [19]

Wengeler et al.

[11] 4,116,390
[45] Sep. 26, 1978

[54] PROCESS FOR REDUCING THE GRAIN SIZE OF PHOSPHATE ROCK

[75] Inventors: Wilhelm Wengeler, Bochum-Stiepel; Egbert Hoffmann, Bochum, both of Germany

[73] Assignee: Uhde GmbH, Dortmund, Germany

[21] Appl. No.: 784,509

[22] Filed: Apr. 4, 1977

Related U.S. Application Data

[63] Continuation of Ser. No. 655,959, Feb. 6, 1976, abandoned.

[30] Foreign Application Priority Data

Feb. 14, 1975 [DE] Fed. Rep. of Germany ....... 2506316

[51] Int. Cl.$^2$ ............................................. B02C 23/14
[52] U.S. Cl. ........................................ 241/24; 241/81
[58] Field of Search ..................... 241/14, 24, 30, 81, 241/227

[56] References Cited

U.S. PATENT DOCUMENTS

| 364,984 | 6/1887 | Barnard | 241/227 |
|---|---|---|---|
| 1,349,221 | 8/1920 | Nolen | 241/81 |
| 2,174,116 | 9/1939 | Bilocq | 241/227 |
| 2,343,270 | 3/1944 | Agnew | 241/24 |
| 2,987,263 | 6/1961 | Senn | 241/81 |

*Primary Examiner*—Granville Y. Custer, Jr.
*Attorney, Agent, or Firm*—Malcolm W. Fraser

[57] ABSTRACT

Freshly mined phosphate rock is subjected to screen classification in at least two stages. Only coarse grained phosphate rock with a grain size over 2 mm from the last screen classification step is fed to a plain-roller grinding mill. The rollers of the grinding mill run at different peripheral speeds, so that the grains are ground by radial and tangential forces. This produces a fine grained phosphate rock whose natural moisture content is advantageous when further processed to phosphoric acid by means of sulphuric acid.

1 Claim, 1 Drawing Figure

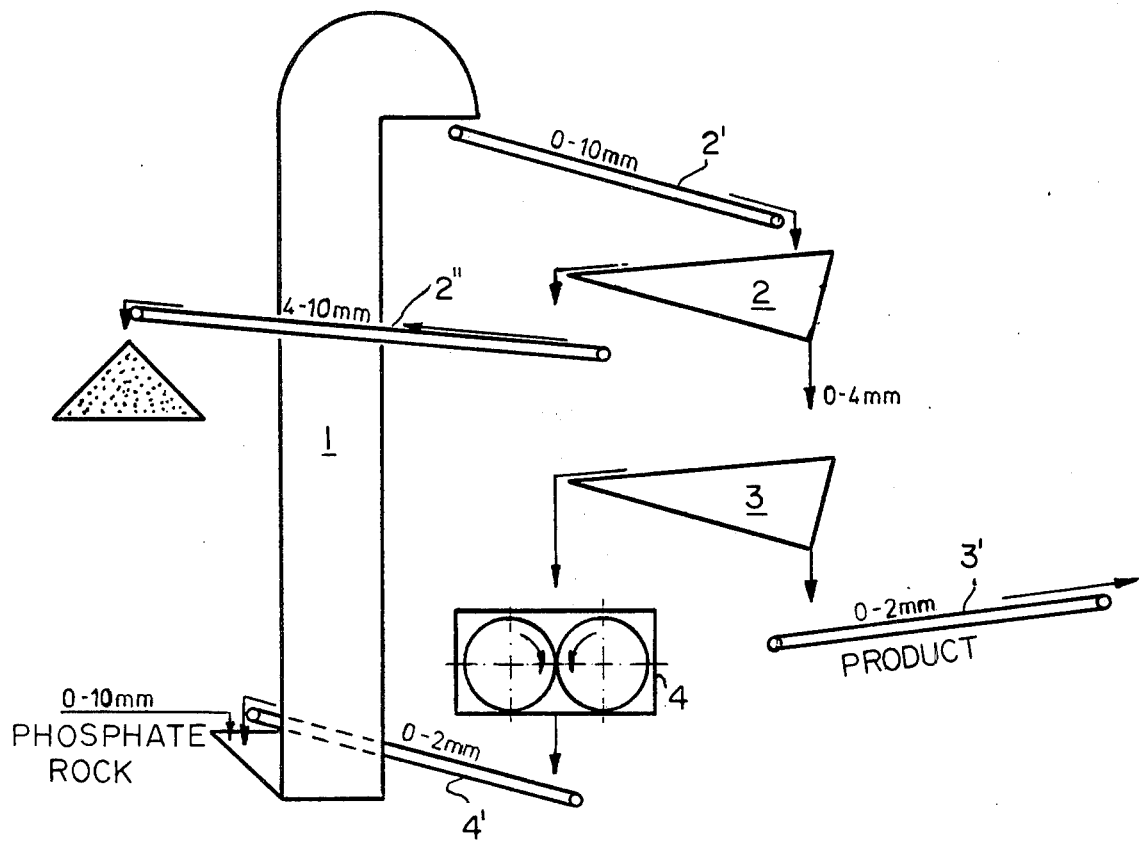

PROCESS FOR REDUCING THE GRAIN SIZE OF PHOSPHATE ROCK

This is a continuation of application Ser. No. 655,959, filed Feb. 6, 1976, which is now abandoned.

BACKGROUND OF THE INVENTION

The invention concerns a process for reducing the grain size of moist pre-crushed phosphate rock to obtain a grain size distribution in which 80 percent is smaller than 2 mm.

Phosphate rock is a hard, coarse-grained mineral. Among other things, it is used to produce phosphoric acid by reaction with sulfuric acid. For this reaction, it is necessary to reduce 80 percent of the phosphate rock to a grain size of under 2 mm.

Two processes have proved to be suitable for reducing the grain size of coarse-grained phosphate rock: dry crushing and wet crushing.

In dry crushing, the coarse-grained phosphate rock, which can have a moisture content of about 10 percent and more, is first subjected to drying whereby this moisture content is reduced to about 1–3 percent. This takes place in a large heated drying drum. Since all the phosphate rock is heated, even that which is finely granulated, high energy consumption for heating is inevitable. Approximately 50 kg of fuel oil per ton of $P_2O_5$ are necessary to reduce then natural phosphate rock moisture of 14 percent to the residual moisture of 3 percent. The mills that grind the phosphate rock consume approximately 70 kWh per ton $P_2O_5$. The screened material is separated into fine and oversize grain fractions by air classifiers.

The moisture content must be increased to over 50 percent for wet grinding in a ball or rod mill. The grinding process is impeded when the moisture content is under 50 percent, because the grinding parts and surfaces are encrusted and clogged.

The phosphate rock that is ground with a moisture content of over 50 percent must be dehydrated again for subsequent treatment. This dehydration is rather difficult since filter cloths with large pore diameters can only bring about an insufficient separation of the fine particles of phosphate rock from the liquid and, on the other hand, filter cloths with small pore diameters become clogged.

Although a combination of grinding and screening is indeed employed for reducing the size of crystals, only dry grinding of phosphate rock in combination with an air classifier has hitherto been commonly practiced, since none of the screens used was capable of properly separating coarse and fine particles due to the fact that the fine and coarse particles were caked together.

It must be said that it is quite possible to screen completely dry phosphate rock. However, with a moisture content between 1 and 5 percent, an electrostatic charge tends to build up resulting in the formation of clusters, the separation of the fine from the coarse grain then being very poor. Over half of the fines present in the starting material can be thus entrained by the rough grain.

SUMMARY OF THE INVENTION

The purpose of this invention is to transform freshly mined phosphate rock into crushed phosphate rock with a high fine grain content using simple mechanical equipment and without using fuel oil, thus avoiding the disadvantage of the known processes in this field.

The invention accomplishes this task by subjecting the freshly mined phosphate rock to screen classification at least twice, followed by grinding the screened material from the last classification step in a plain-roller grinding mill.

BRIEF DESCRIPTION OF THE DRAWING

The FIGURE is a diagrammatic view of an apparatus for carrying out the several steps of the process in accordance with this invention.

DESCRIPTION OF THE PREFERRED EMBODIMENT

According to the process, freshly mined phosphate rock with a grain size ranging from about 0–10 mm. is charged onto an elevator 1 and then fed to a first vibrating screen 2 by means of a belt conveyor 2'. The first vibrating screen 2 has a mesh size of 4 mm. through which will pass only the fine-grained material with a grain size of less than 4 mm. The course-grained material with a grain size of more than 4 mm. drops onto a coveyor means 2'' to a discard pile. The fine-grained material with a grain size of less than 4 mm. is fed to a vibrating screen 3, the mesh size of which is 2 mm. The material having a fine grain size of up to 2 mm. passes through screen 3 and constitutes the product which is used to produce phosphoric acid by subsequent reaction with sulfuric acid. The product is conveyed from the instant process for further treatment by conveyor means 3'. A second fraction of material having a grain size between 2 mm. and 4 mm. having been rejected by screen 3, is fed to a plain-roller grinding mill 4 where the material is reduced to a grain size of less than 2 mm. The output from the grinding mill 4 is returned to elevator 1 by conveying means 4' to be resubjected to screens 2 and 3 and ultimately withdrawn by product conveyor means 3'.

It is characteristic of this invention that the freshly mined phosphate rock is subjected to screening classification in at least two stages. Only coarse grained phosphate rock with a grain size of over 2 mm arrives in the plain-roller grinding mill. The plain-roller grinding mill is operated with the rollers running at different speeds in order to achieve a self cleaning effect of the rollers by virtue of the difference in peripheral speeds in the gap between the rollers. The much feared caking of ground phosphate rock does not take place on the rollers. The grains that arrive between the rollers are ground by radial and tangential forces, the latter resulting from the difference in peripheral speeds.

The process, according to this invention, has the particular advantage of direct processing of freshly mined phosphate rock. There is no necessity for either a drying process with subsequent grinding, which involves complex equipment and consumes large quantities of energy, nor for an excessive increase of moisture to over 50 percent with its resultant problems of filtration of the phosphate slurry. The process, according to this invention, leads directly to a fine grained phosphate rock whose natural moisture content proves to be particularly advantageous, for example when further processed to phosphoric acid by means of sulfuric acid.

The following examples give numerical values of the process according to the invention for reducing the size of phosphate rock. The process is not limited to these numerical values but includes also those that lie in neighboring domains.

1. Wet screening on vibrating screen

| Moisture content of phosphate rock | 13.8 percent |
|---|---|
| Grain size | Original material |
| over 6.3 mm | 12.4 percent |
| 6.3 - 2 mm | 14 percent |
| 2 - 1 mm | 13.2 percent |
| under 1 mm | 60.4 percent |

The screening was done on two screens in succession. Inclination of both screens 12°

| Mesh size | Screen 1<br>4 mm | Screen 2<br>2 mm |
|---|---|---|
| Quantity fed to screen 1: | 75 kg | |
| Coarse grain overflow: | 19 kg | |
| Passed through screen: | 56 kg | |

The quantity passed through screen 1 was fed to the second screen.

| Grain coarse overflow: | 4 kg |
|---|---|
| Passed through screen: | 52 kg |

About 3.5 percent of grains under 1 mm were present in the quantities of 19 kg and 4 kg passed through the screens.

2. Grinding in plain-roller grinding mill

| Peripheral speed: | $U_1 = 11.1$ m/s<br>$U_2 = 13.4$ m/s |
|---|---|
| Grain size of infeed: | Overflow of 2 mm screen from (1) |
| Moisture content: | 13.8 percent |
| Bulk density: | 1.0 t/m$^3$ |
| Roller gap: | 0.7 mm |

The crushed material has the following fine grain content:

| 2 - 1 mm | 18.18 percent |
|---|---|
| 0.5 - 1 mm | 24.05 percent |
| 0.2 - 0.5 mm | 35.93 percent |
| under 0.2 mm | 21.84 percent |

Specific energy requirements: 13.5 kWh/t $P_2O_5$

What we claim is:

1. The process for transforming freshly mined phosphate rock having a moisture content of about 10–14% into crushed phosphate rock having a grain size under 2 mm. for further treatment in the production of phosphoric acid comprising the steps of:
    (a) screening the freshly mined rock with a first screen to eliminate a first fraction consisting essentially of grain sizes greater than 4 mm.,
    (b) disposing of the first fraction,
    (c) screening that rock which passes through the first screen with a second screen to isolate a second fraction consisting essentially of grain sizes between 4 mm. and 2 mm.,
    (d) grinding the second fraction in a plain-roller mill to a grain size inferior to 2 mm.,
    (e) combining the second fraction after grinding with freshly mined rock being subjected to the first screen, and
    (f) removing crushed phosphate rock of a grain size inferior to 2 mm. as it passes through the second screen.

* * * * *